United States Patent
Heppel

(10) Patent No.: US 8,347,699 B2
(45) Date of Patent: Jan. 8, 2013

(54) PROCEDURE FOR DETERMINING AT LEAST ONE MISFIRING CYLINDER OF A COMBUSTION ENGINE, CONTROL UNIT AND MOTOR VEHICLE DRIVE TRAIN

(75) Inventor: Claus Heppel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 12/705,684

(22) Filed: Feb. 15, 2010

(65) Prior Publication Data
US 2010/0206125 A1 Aug. 19, 2010

(30) Foreign Application Priority Data

Feb. 17, 2009 (DE) .......................... 10 2009 000 921
Feb. 3, 2010 (DE) .......................... 10 2010 001 534

(51) Int. Cl.
*G01M 15/11* (2006.01)
(52) U.S. Cl. ..................................................... 73/114.03
(58) Field of Classification Search ............... 73/114.02, 73/114.03, 114.04, 114.05
See application file for complete search history.

(56) References Cited

U.S. PATENT DOCUMENTS

| | | | | | |
|---|---|---|---|---|---|
| 5,747,679 | A | * | 5/1998 | Dietz et al. | 73/114.03 |
| 5,822,710 | A | * | 10/1998 | Mezger et al. | 701/110 |
| 5,951,617 | A | * | 9/1999 | Shinohara et al. | 701/110 |
| 6,023,964 | A | * | 2/2000 | Kanbara et al. | 73/114.04 |
| 7,158,875 | B2 | * | 1/2007 | Yasui et al. | 701/111 |
| 2002/0157459 | A1 | * | 10/2002 | Lehner et al. | 73/117.3 |
| 2004/0144165 | A1 | * | 7/2004 | Yamada et al. | 73/118.1 |
| 2006/0000264 | A1 | * | 1/2006 | Kim | 73/117.3 |
| 2009/0107224 | A1 | * | 4/2009 | Katayama | 73/114.04 |

* cited by examiner

Primary Examiner — Eric S McCall
(74) Attorney, Agent, or Firm — Merchant & Gould P.C.

(57) ABSTRACT

At a procedure for determining at least one misfiring cylinder (1, 2, 3, 4) of a combustion engine (12) with an even number n of at least four cylinders (1, 2, 3, 4), whereby at least each cylinder (1, 2, 3, 4) is assigned to its own angle segment of a work cycle of the combustion engine (12) and whereby uneven running values (luts) are determined for each cylinder (1, 2, 3, 4), the uneven running values (luts) are evaluated with regard to the fulfillment of a condition (1., 2., 3., 4.), which is set depending on the length of the angle segment or a part or a multiple of it and which corresponds with a default misfiring pattern of the combustion engine (12).

11 Claims, 9 Drawing Sheets

PROCEDURE FOR DETERMINING AT LEAST ONE MISFIRING CYLINDER OF A COMBUSTION ENGINE, CONTROL UNIT AND MOTOR VEHICLE DRIVE TRAIN

This application claims benefit of Serial No. 10 2009 000 921.3, filed 17 Feb. 2009 in Germany and Serial No. DE 10 2010 001 534.2, filed 3 Feb. 2010 in Germany and which applications are incorporated herein by reference. To the extent appropriate, a claim of priority is made to each of the above disclosed applications.

BACKGROUND

The invention relates to a procedure for determining at least one misfiring cylinder of a combustion engine.

It is known from prior use to determine misfiring cylinders of a combustion engine by measuring the time for the passage of an angle segment and by creating uneven running values from those time measurements. The uneven running values can for example be stated as angle accelerations or values that are equivalent or derived from it. Usually a positive uneven running corresponds with a misfiring cylinder and a negative uneven running with a firing cylinder.

The determination of a misfiring cylinder is important in order to comply with statutory provisions for an onboard diagnosis, in order to avoid catalytic converter damages and in order to be able to switch off the misfiring cylinder or cylinders of the combustion engine, so that the combustion engine can be further operated on the remaining cylinders. The switching off of a wrong cylinder, thus of a not misfiring cylinder, can cause that the combustion engine cannot be operated anymore.

It has shown that a reliable determination of at least one misfiring cylinder of a combustion engine is not ensured under all operating conditions of a combustion engine.

SUMMARY

The task of the invention is to provide a procedure with which misfiring cylinders of a combustion engine can be determined as reliably as possible.

This task is solved by a procedure with the characteristics of claim 1. Advantageous improvements are stated in the sub-claims. Furthermore there are important characteristics that can be found in the following description and drawing, whereby the characteristics can be important for the invention by themselves as well as in different combinations, without explicitly pointing this out once again.

An irregular running of a combustion engine cannot only be based on the fast that one or several cylinders are misfiring, but also on the fact that interferences act upon the combustion engine from the outside.

The crankshaft of a combustion engine for example can be coupled with a transmission over a multi-mass flywheel, in particular a two-mass flywheel. Such a multi-mass flywheel provides masses that can vibrate towards each other in rotational direction and reversed to it. Usually a first mass is connected in a torque-proof way with the crankshaft of the combustion engine, while a second mass is suspended for example by springs and/or torsion dampers relatively to the first mass in rotational direction of the crankshaft and reversed to it so that it can vibrate. The second mass can usually be connected to a transmission over a clutch.

The second mass can vibrate relatively to the first mass, so that depending on the second mass' own frequency the vibration of this second mass can transfer onto the first mass and thus onto the crankshaft. This overlapping of the vibrations can cause a phase shifting of the uneven running values, so that misfiring cylinders cannot be identified correctly.

It has been detected within the scope of this invention that based on the firing order of the combustion engine the following relation applies for alternately misfiring and firing cylinders:

$$\Delta t_{segment}(a) \approx -\Delta t_{segment}(a + a_{Segment})$$

with $\Delta t_{Segment}(a)$: angle segment time change at a crankshaft position a $a_{Segment}$: length of the angle segment This means that during a transfer from a misfiring to a firing and from a firing to a misfiring cylinder always positive and negative angle segment time changes follow each other, in particular with a distance, which corresponds with the length of the angle segment.

This relation can also be expressed by the following first condition:

$$|luts(a)+luts(a+a_{Segment})| < \epsilon \approx 0 \quad (1.\ condition)$$

with $luts(a)$: uneven running value at a crankshaft position a $\epsilon$: threshold value Consecutive uneven running values are hereby added in a distance of the length of the angle segment in order to check whether they almost compensate each other. Since the time measurements that are required for the determination of uneven running values are not absolutely exact the uneven running values are not compared with the value "zero" but with regard to the fact that a threshold value is exceeded, which almost equals "zero".

Furthermore it has been detected within the scope of the invention that the following relation applies to misfiring cylinders that follow each other in the firing order, which alternate with the same number of consecutive firing cylinders:

$$\Delta t_{Segment}(a) \approx -\Delta t_{Segment}\left(a + \frac{n}{2} a_{Segment}\right)$$

with $\Delta t_{segment}(a)$: angle segment time change at a crankshaft position a $a_{Segment}$: length of an angle segment n: number of cylinders This means that always after n divided by 2 consecutive angle segments the amounts of the uneven running repeats, whereby the algebraic sign of those uneven running values is reversed. This relation can also be expressed by the following second condition:

$$\left|luts(a) + luts\left(a + \frac{n}{2} a_{Segment}\right)\right| < \epsilon \approx 0 \quad (2.\ condition)$$

with luts (a): uneven running value at a crankshaft position a $\epsilon$: threshold value n: number of cylinders According to the invention the checking of at least one previously stated first or second condition allows to be able to male more precise statements about the misfiring behavior of the combustion engine.

In particular for the case that the first condition is fulfilled or at least approximately fulfilled, it can be detected as misfiring: a first cylinder with a maximum uneven running value and at least a further cylinder, which is/are shifted by an integral positive multiple of the number 2 in the firing order of the combustion engine relative to the first cylinder. Thereby also the cylinder with the maximum uneven running value is detected as misfiring and additionally the next but one cylinder in firing order, so that misfiring patterns of the structure misfiring-firing-misfiring-firing . . . can be identified.

If the combustion is a four-cylinder, thus the number n of cylinders amounts to four, it can be detected as misfiring: a first cylinder with a maximum uneven running value and a further cylinder, which I shifted in firing order of the combustion engine relative to the first cylinder by the number 2, thus based on the first cylinder in firing order the next but one cylinder.

In particular in case the above stated second condition is fulfilled or at least approximately fulfilled, it can be detected as misfiring: a first cylinder with a maximum uneven running value and at least one further cylinder that follows in firing order of the combustion engine the first cylinder, whereby the number of the further cylinders is n divided by 2−1. Thereby a misfiring pattern of the structure misfiring-misfiring-firing-firing can be determined. This means that half of the cylinders misfire following each other and that the cylinders that follow each other in firing order fire. At a six-cylinder engine this means that three firings follow three misfires.

In the case the combustion engine is a four-cylinder and the second condition is fulfilled or at least approximately fulfilled, it can be detected as misfiring: a first cylinder with a maximum uneven running value and a further cylinder, which directly follows the first cylinder in firing order.

It has also been detected within the scope of the invention that when transferring from a firing cylinder to a misfiring cylinder this misfiring cylinder is assigned to a maximum uneven running value. Thereby a reference point is created, which enables the determination of the first misfiring cylinder.

According to one embodiment of the invention the uneven running values of at least one work cycle are evaluated with regard to at least one further condition, which refers at least approximately to a repetition of absolute uneven running values or the amounts of the absolute uneven running values with a default repetition frequency.

The repetition frequency of the at least one further condition equals in particular an angle segment multiplied with a positive integral value bigger than or equal 2. For a misfiring pattern of the structure misfiring-firing-firing-misfiring-firing-firing at a six-cylinder engine the following applies therefore:

$$\Delta t_{Segment}(a) \approx \Delta t_{Segment}(a+3a_{Segment})$$

so that the further condition results:

$$|luts(a)-luts(a+3a_{Segment})| < \epsilon \approx 0 \quad \text{(3. condition)}$$

For a combustion engine with eight cylinders a misfiring pattern of the structure misfiring-misfiring-firing-firing-misfiring-misfiring-firing-firing can be described by the following relation:

$$\Delta t_{Segment}(a) \approx \Delta t_{Segment}(a+2a_{Segment})$$

so that the further condition results:

$$|luts(a)-luts(a+2a_{Segment})| < \epsilon \approx 0 \quad \text{(4. condition)}$$

It is advantageous for a reliable evaluation of the misfiring pattern of a combustion engine if the uneven running values are evaluated at least with regard to the above stated first condition and second condition. The additional evaluation of further conditions (for example a previously stated third or fourth condition) can be in particular advantageous at a combustion engine with a higher number of cylinders.

The evaluation of the uneven running values at least with regard to the first condition and with regard to the second condition has the advantage that it can simultaneously be checked whether one a single cylinder of the combustion engine misfires. In particular in case none of the conditions (for example neither the first condition nor the second condition) is fulfilled, only one cylinder is detected as misfiring, which is assigned to a maximum uneven running value. By doing so multiple misfires as well as single misfires can be reliably detected with the aid of the conditions according to the invention.

The invention furthermore relates to a control unit, which is customized for implementing a previously stated procedure.

Furthermore the invention relates to a motor vehicle drive train according to the generic term of claim 11, which is characterized by a control unit, which is customized to implement a previously stated procedure.

BRIEF DESCRIPTION OF THE DRAWINGS

Subsequently embodiments of the invention are explained with the aid of the attached drawing. The drawing shows in.

DETAILED DESCRIPTION

Figure 1:
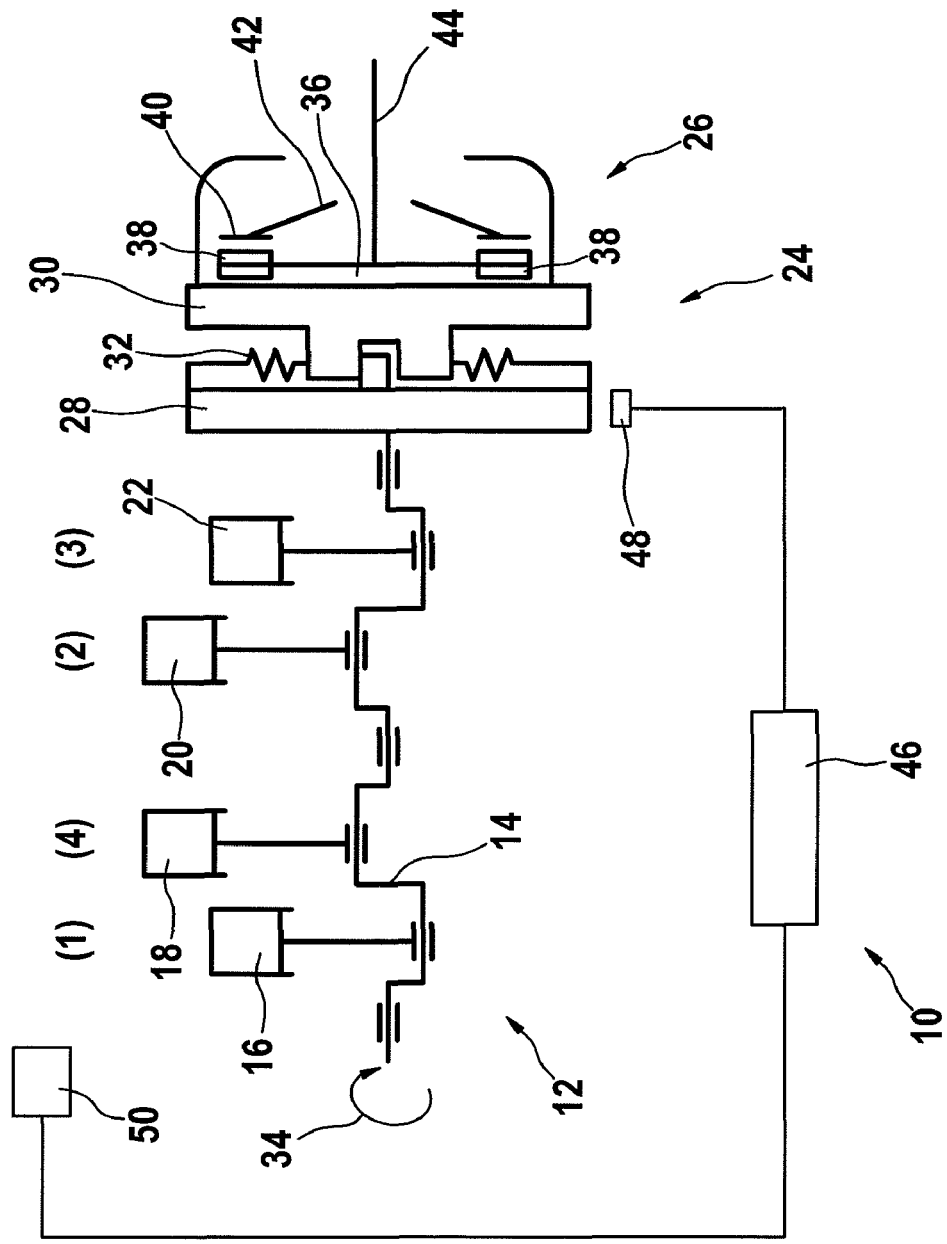
FIG. 1 is a schematic view of an embodiment of a motor vehicle drive train.

An embodiment of a motor vehicle drive train that is shown in FIG. 1 is altogether labeled with the reference signs 10 and comprises a combustion engine 12 with a crankshaft 14. Pistons 16, 18, 20 and 22 are mounted at the crankshaft 14. The pistons 16, 18, 20 and 22 are each assigned to a cylinder, which is labeled in FIG. 1 with 1, 2, 3 and 4 according to the firing order of the combustion engine.

The crankshaft 14 is connected with a clutch 26 over a multi-mass flywheel 24 that is construed as two-mass flywheel. The multi-mass flywheel 24 comprises a first mass 28, which is connected to the crankshaft 14 in a torque-proof way. Furthermore the multi-mass flywheel 24 comprises a second mass 30, which is mounted at the first mass 28 in such a way that the second mass 30 can vibrate relatively to the first mass 28. The masses 28 and 30 are particularly connected with each by springs 32, so that the second mass 30 can vibrate in a rotational direction 34 of the crankshaft 14 and reversed to it.

The clutch 26 comprises a driving disc 36, which provides clutch linings 38 that are arranged on sides that are opposing each other. The clutch 26 provides furthermore a pressure plate 40, which can be pressed against the clutch linings 38 of the driving disc 36 with the aid of a disc spring 42 in order to create traction between the driving disc 36 and the second mass 30. The driving disc 36 is connected to the transmission input shaft 44 in a torque-proof way so that at a closed clutch a rotational movement of the crankshaft 14 is transferred onto the transmission input shaft 44. In decoupled status of the clutch 26 as it is shown in FIG. 1 the second mass 30 can vibrate relatively to the first mass 28. This causes that a vibrating movement of the second mass 30 is transferred over the springs 32 onto the first mass 28 and thus onto the crankshaft 14.

The motor vehicle drive train 10 comprises furthermore a control unit 46, which is connected with a crankshaft sensor 48 as well as with a camshaft sensor 50 over a data lines (without reference signs). The crankshaft sensor 48 serves for the detection of a toothed pattern that is arranged at the circumference of the first mass 28, so that the angle position of the crankshaft 14 can be determined by a degree area of 360°. Furthermore the angle position of a (nor shown) camshaft can be detected with the aid of the camshaft sensor 50, so that the angle position of the crankshaft 14 can be determined over a work cycle of the combustion engine 12 of 720°.

At the illustrated combustion engine 12 with a n umber of cylinders n=4 each cylinder 1 to 4 is assigned to one of four different consecutive angle segments, whereby each of those angle segments reaches over 180°.

If one or several cylinders 1 to 4 misfire during the operation of the combustion engine 12 the crankshaft 14 does not rotate steadily but is exposed to positive and negative accelerations.

An extension of the angle segment times due to a misfiring cylinder usually comes along with a positive uneven running, while shortened angle segment times, which occur at firing cylinders, come along with a negative uneven running.

In a status of the combustion engine 12 that is not interfered by the mass 30 a misfiring cylinder can therefore be detected, thereby that this cylinder is assigned to a positive uneven running But if the second mass 30 transfers vibrations onto the first mass 28 and thus onto the crankshaft 14 anyway, it is possible that a transfer takes place in such a way that an uneven running that is assigned to a misfiring cylinder is not positive but negative. Therefore such a cylinder could be mistakenly detected as firing cylinder instead of a misfiring cylinder. Such a cylinder is therefore not switched off, for example by interrupting the fuel supply (and if necessary the ignition).

In a corresponding way it can happen at an overlapping of the vibrations of the second mass 30 and the vibrations of the crankshaft 14 that firing cylinder with shorter angle segment times, which come along with a negative uneven running, are influenced in such a way that the angle segment times change in such a way that a positive uneven running, thus a positive uneven running value is detected. Such a cylinder, which is functional, could therefore be mistakenly switched off.

In order to be able to reliably determine which cylinder or cylinders 1 to 4 is misfiring even if an interference of the uneven running 14 by the mass 30 is present, the uneven running values are checked with regard to whether and if yes which of the following conditions is fulfilled:

$$|luts(a) + luts(a + a_{Segment})| < \varepsilon \approx 0 \quad (1.\ \text{condition})$$

$$\left|luts(a) + luts\left(a + \frac{n}{2} a_{Segment}\right)\right| < \varepsilon \approx 0 \quad (2.\ \text{condition})$$

with
luts(a): uneven running value at a crankshaft position a
$a_{Segment}$: length of an angle segment
n: number of cylinders
ε: threshold value For the embodiment that is illustrated in the drawing the length of an angle segment amounts to 180°, the number of cylinder is 4 and the threshold value for example 5.

Figure 2:
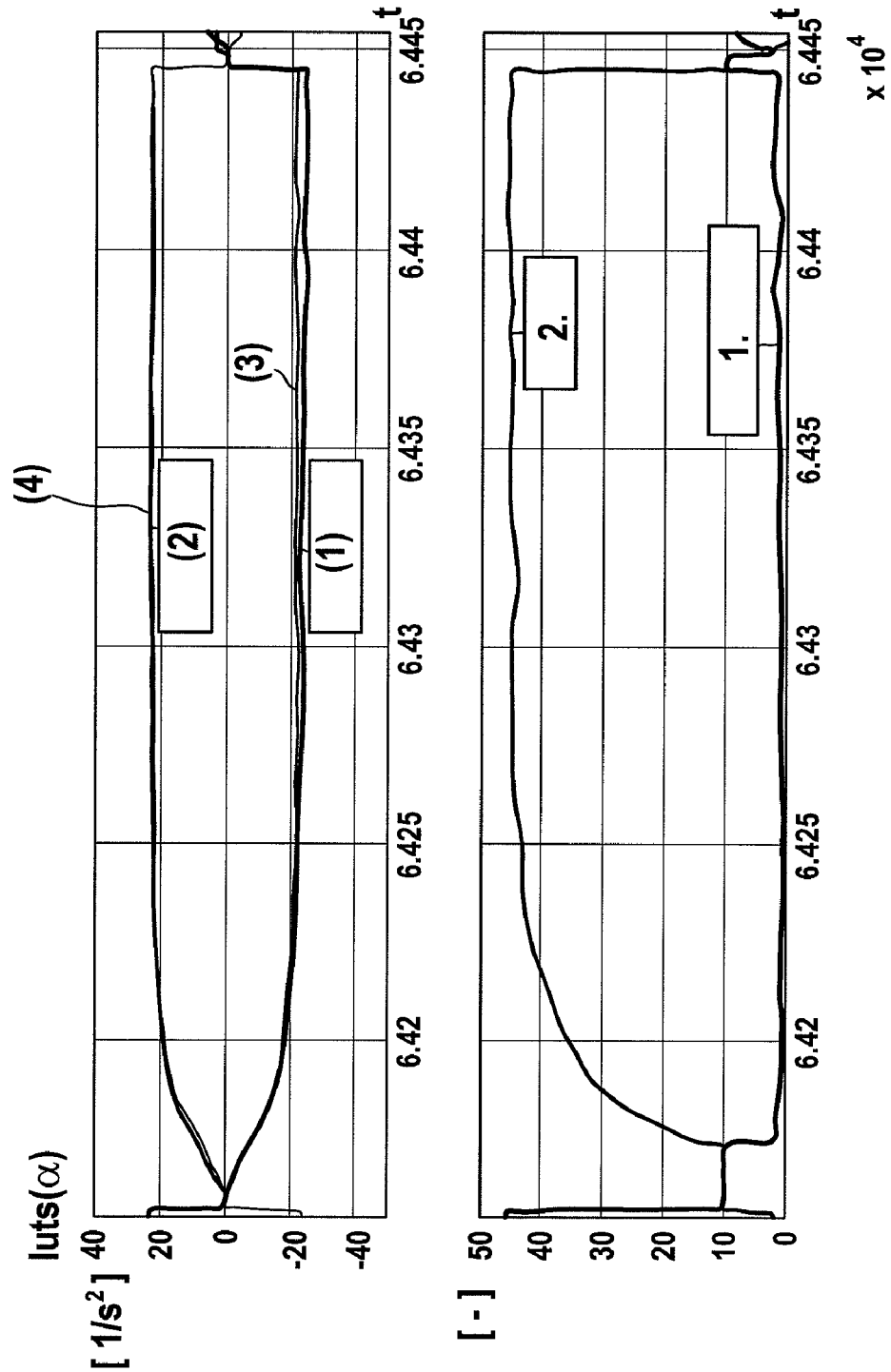
FIG. 2 for the example of a combustion engine with four cylinders uneven running values that are put on above the time (upper part of the diagram) and values of a first condition and a second condition that are put one above the time (lower part of the diagram) for a first misfiring pattern.

In case every second cylinder 1 to 4 of the combustion engine 12 misfires, for example the cylinders 2 and 4, this results in a misfiring pattern of the structure firing-misfiring-firing-misfiring. With reference to FIG. 2 this case results in positive uneven running values for the cylinders 2 and 4 and negative uneven runnings for the firing cylinders 1 and 3 (compare upper part of the diagram according to FIG. 2).

Absolute numeric values are put on in the lower part of the diagram according to FIG. 2, which result from checking the first and the second condition. The mentioned misfiring pattern implies that the first condition is fulfilled because it falls below a threshold value, which is around 0. The second condition is not fulfilled. This implies that always two cylinders that are shifted by each other, thus cylinder 2 and 4, can be detected as misfiring.

Figure 3:
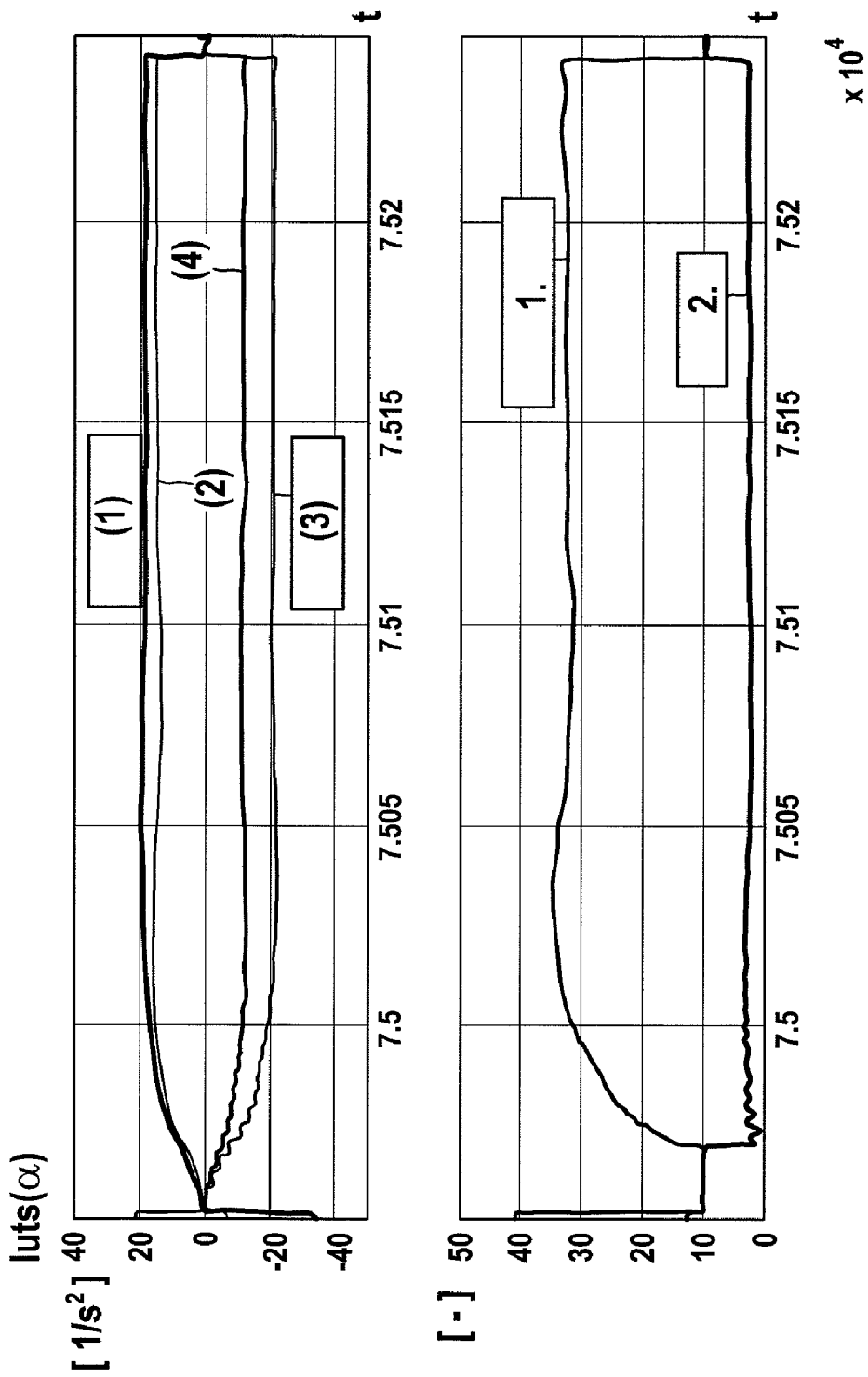
FIG. 3 is an illustration for a further misfiring pattern that corresponds with FIG. 2.

In case the cylinders 1 to 4 that are following each other in firing order misfire, for example the cylinders 1 and 2, this results in positive uneven running values for the cylinders 1 and 2 and negative uneven running values for the cylinders 3 and 4 (compare FIG. 3). Because the second condition is fulfilled in that case (values are around 0 and fall below the threshold value of for example 5), this implies the second misfiring pattern that is assigned to the second condition, according to which cylinders misfire that are following each other in firing order and alternate with two consecutive combustion processes.

The previously stated courses of the uneven running values with reference to FIGS. 2 and 3 result from the case that the crankshaft 14 of the combustion engine 12 is not excited from the outside with additional vibrations. Based on the situation illustrated in FIG. 3 in case such an excitation takes place for a misfiring pattern with the structure misfiring-misfiring-firing-firing this can imply that one of the misfiring cylinders, namely cylinder 1, is further assigned to a positive uneven running value. But the uneven running values that are assigned to the cylinder 2 shift to negative values, which could be misinterpreted to the effect that the cylinder 2 is no misfiring cylinder. In a corresponding way the cylinder 3 is furthermore assigned to negative uneven running values, but cylinder 4 not to negative uneven running values (compare FIG. 3) but positive uneven running values (compare FIG. 4). This could be misinterpreted to the effect that cylinder 4 is a misfiring cylinder.

By checking whether the second condition is fulfilled it is possible to determine that it is a case with the misfiring pattern misfiring-misfiring-firing-firing. Because the cylinder, which follows a firing cylinder as first misfiring cylinder in firing order, provides the highest uneven running values, it can be unequivocally determined in the situation shown in FIG. 4 that cylinder 1 is misfiring. Simultaneously it can be determined with the information that the second condition is fulfilled, that also cylinder 2 that follows cylinder 1 in firing order is misfiring. Thus cylinder 2, which is assigned to negative uneven running values, can still be detected as misfiring. In a corresponding way cylinder 4, which is assigned to positive uneven running values, can still be detected as firing cylinder.

Figure 5:
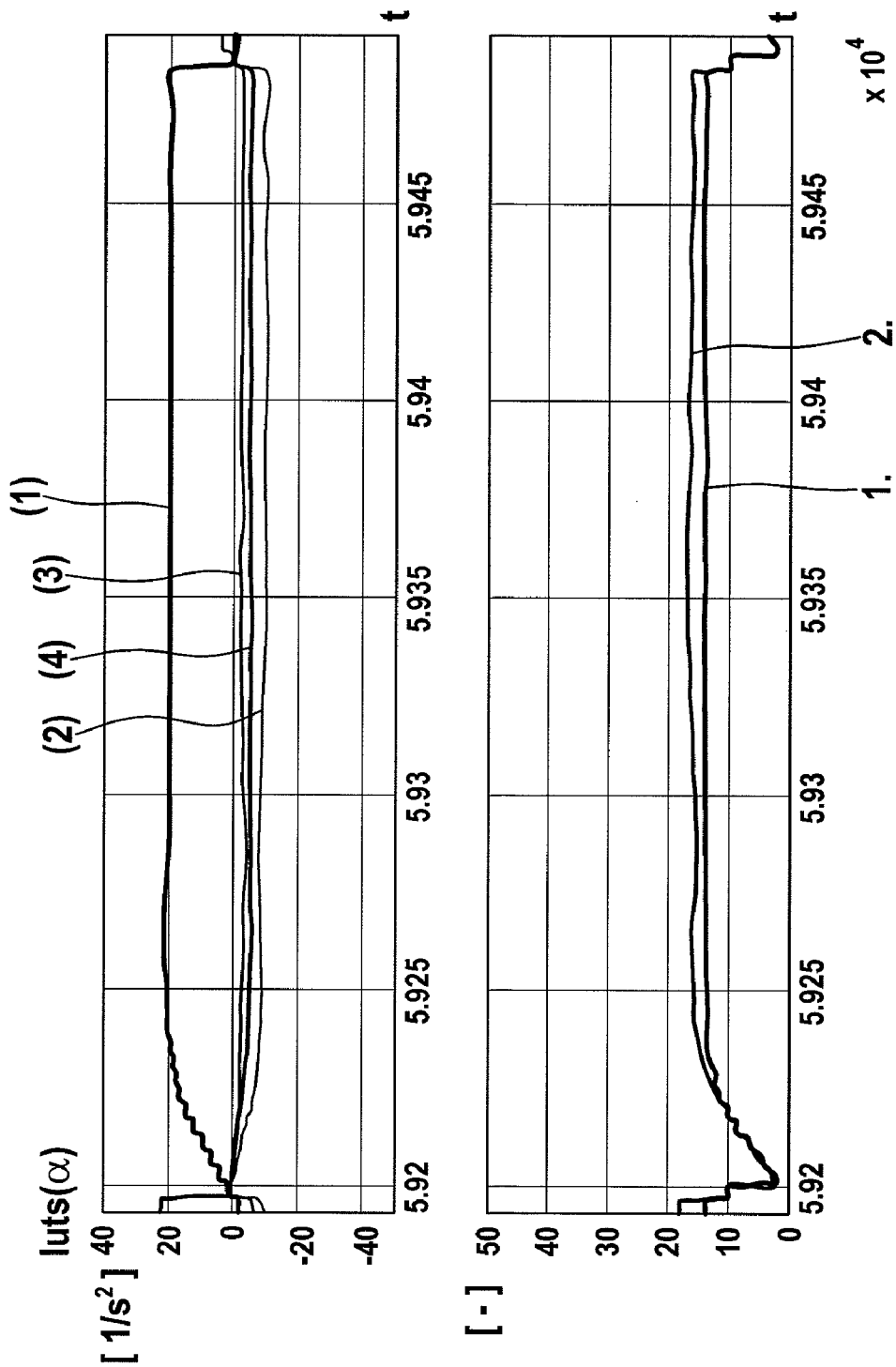
FIG. 5 an illustration for a single misfiring cylinder that corresponds with FIG. 2.
Figure 6:
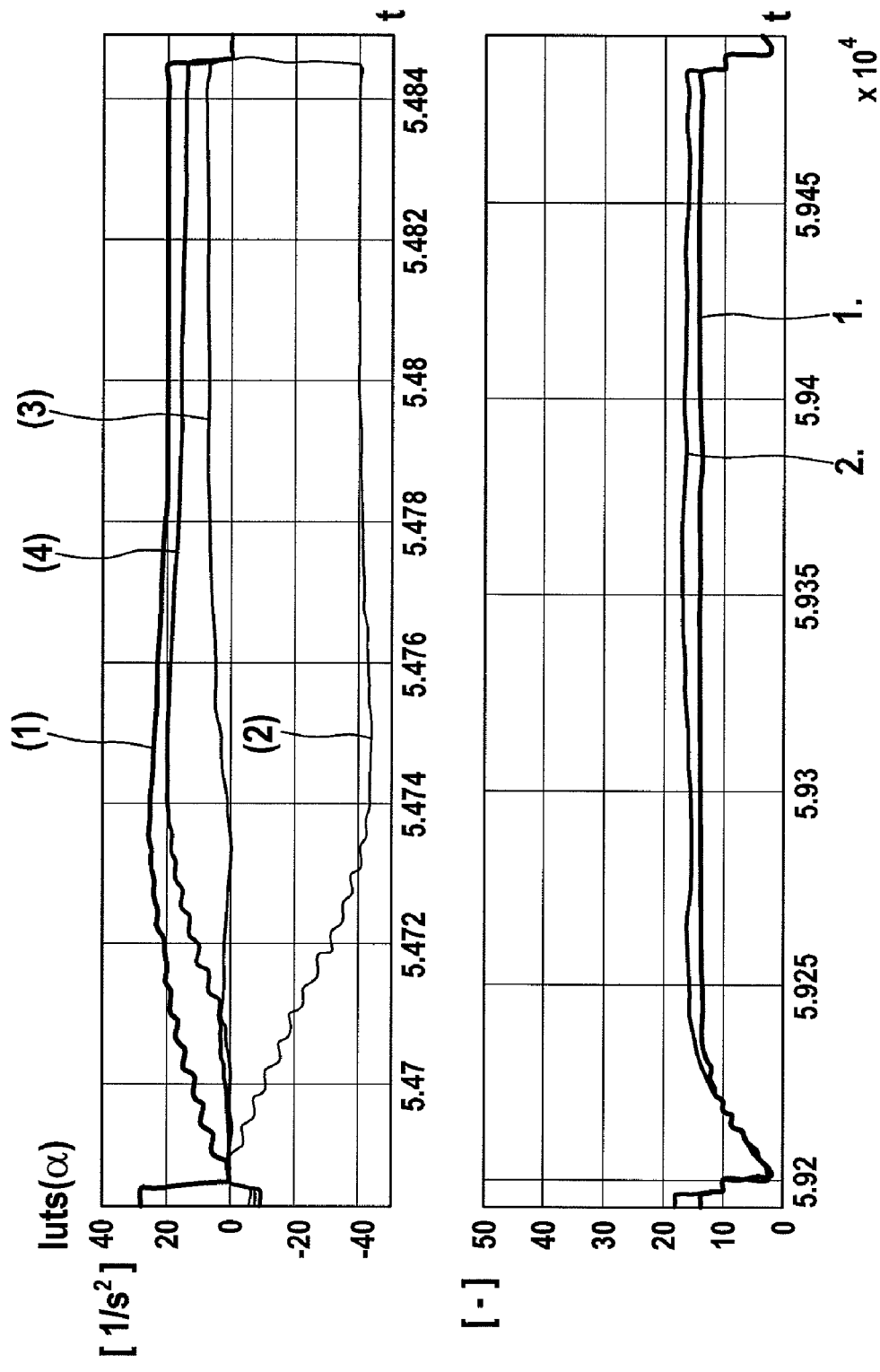
FIG. 6 is an illustration during an interference of the uneven running values of the combustion engine from the outside that corresponds with FIG. 5.

In case only one of the cylinders 1 to 4 is misfiring ("single misfiring") this implies a constellation that is shown in FIG. 5 for an uninterrupted case and a constellation that is shown in FIG. 6 for an interrupted case.

For the uninterrupted case it is implied that at a misfiring cylinder 1 of the combustion engine 12 this cylinder is assigned to positive uneven running values, while the remaining cylinders 2, 3 and 4 are assigned to negative uneven running values (compare FIG. 5). Because it is a single misfiring neither the first nor the second condition is fulfilled (values are significantly higher than 0).

In the interrupted case the crankshaft 14 is overlapped with a vibration from the outside at a misfiring cylinder 1, for example with the aid of the second mass 30. Thereby the negative uneven running values of the cylinders 3 and 4 (compare FIG. 5) shift over to positive uneven running values (compare FIG. 6). The conditions 1 and 2 are still not fulfilled. Because none of the conditions is fulfilled this indicates a single misfiring, whereby the cylinder, which provides the highest uneven running values, is detected as misfiring, thus cylinder 1 for the embodiment that is shown in the drawing.

Figure 4:
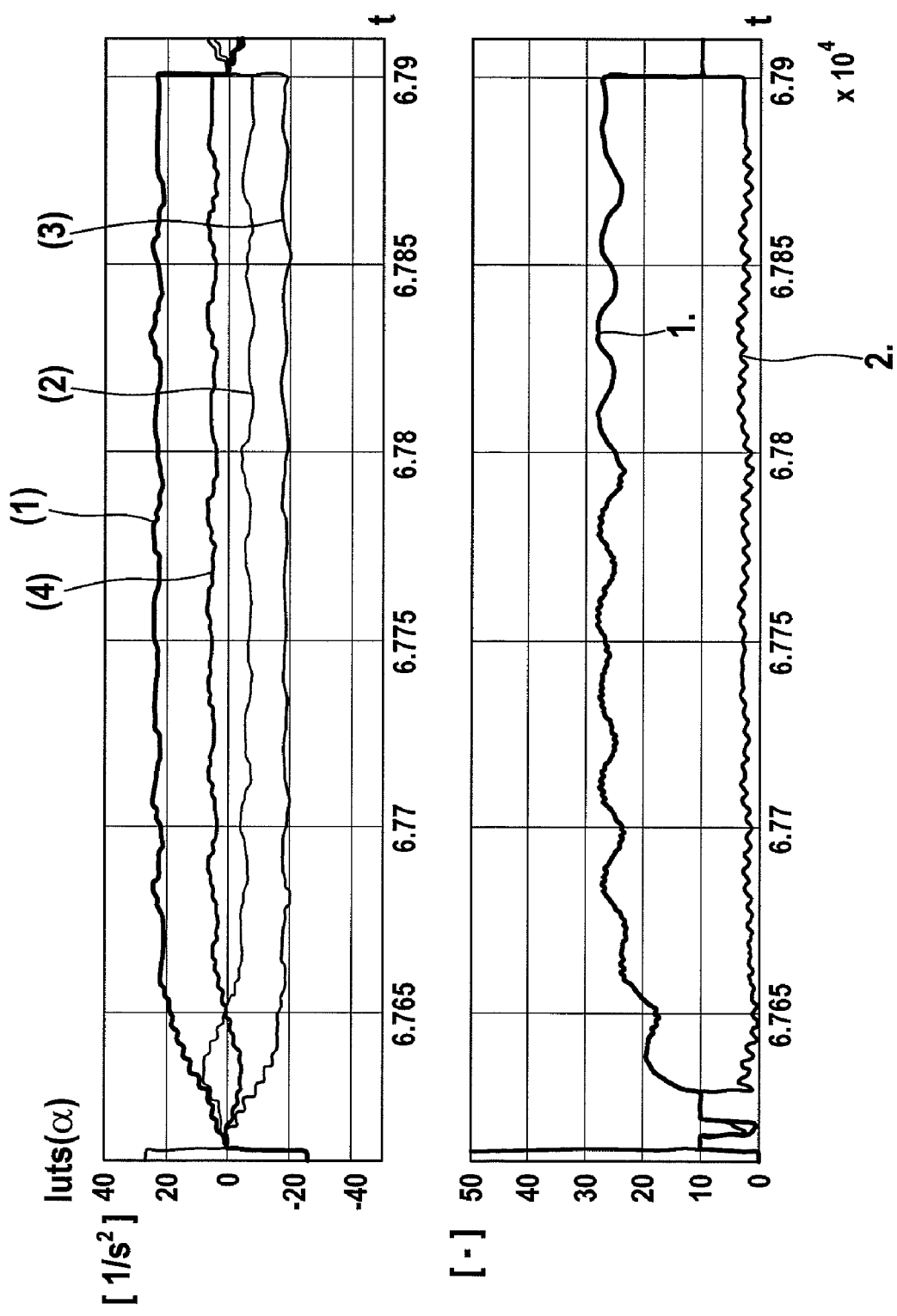
FIG. 4 is an illustration for a further misfiring pattern that corresponds with FIG. 3 and which can result from an interference of the uneven running values of the combustion engine from the outside.
Figure 7:
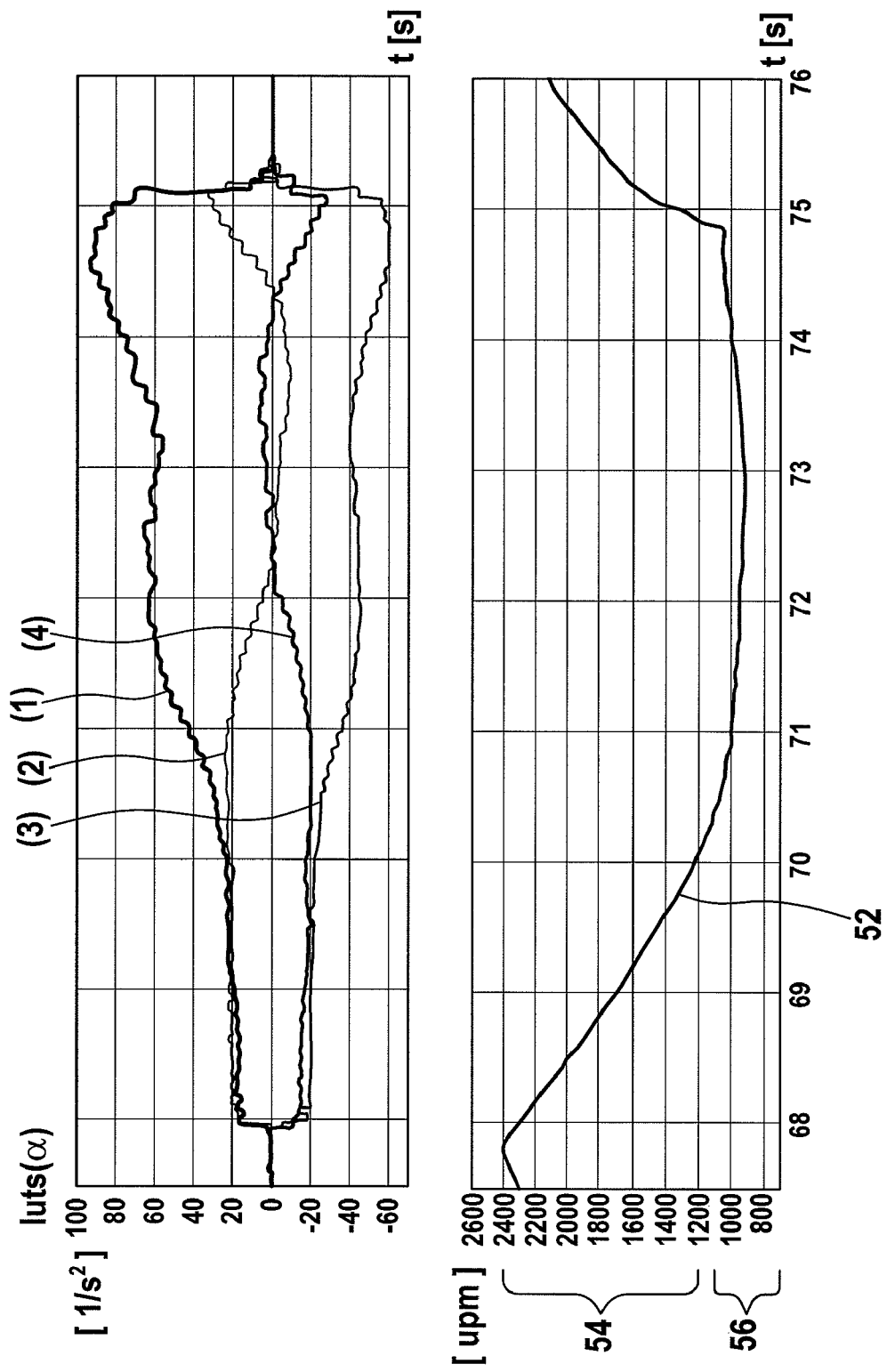
FIG. 7 uneven running values of individual cylinders (upper part of the diagram) put on above the time compared to the engine speed of the combustion engine (lower part of the diagram)

With reference to FIG. 7 the influence of the engine speed of the combustion engine 12 onto a shifting of the uneven running values of the cylinders 1 to 4 is discussed in the following for the example of a misfiring pattern misfiring-misfiring-firing-firing (compare FIG. 4). FIG. 7 shows the engine speed of the combustion engine 12 with the aid of a course 52 over a time axis. The uneven running values of the cylinders 1 to 4 that correspond with the time axis are put in the upper part of the diagram of FIG. 7. In the upper engine speed range 54 of for example higher than 1.200 Upm, which occurs for example in a timeframe of 68 s to 70 s, the cylinders 1 and 2 are assigned to positive uneven running values, the cylinders 3 and 4 to negative uneven running values.

In a lower engine speed range 56 of for example lower than 1.000 Upm the second mass 30 is excited to a vibration over the crankshaft 14, whereby the excitation frequency that depends on the crankshaft 14 lies around the frequency of the mass 30 itself (or the frequency of the mass 30 and a part of the drive train that is connected to it). Thereby the mass 30 is excited to vibrate, whereby this vibration also transfers back onto the crankshaft 14. This result in a shift of the uneven running values of cylinder 2 from positive to negative uneven running values and of the uneven running values of cylinder 4 from negative to positive uneven running values that are shown in FIG. 7 in a timeframe of for example 72 s to 74 s. But the cylinders 1 and 2 can still be detected as misfiring in this range as it has been described previously with reference to FIG. 4.

Figure 8:
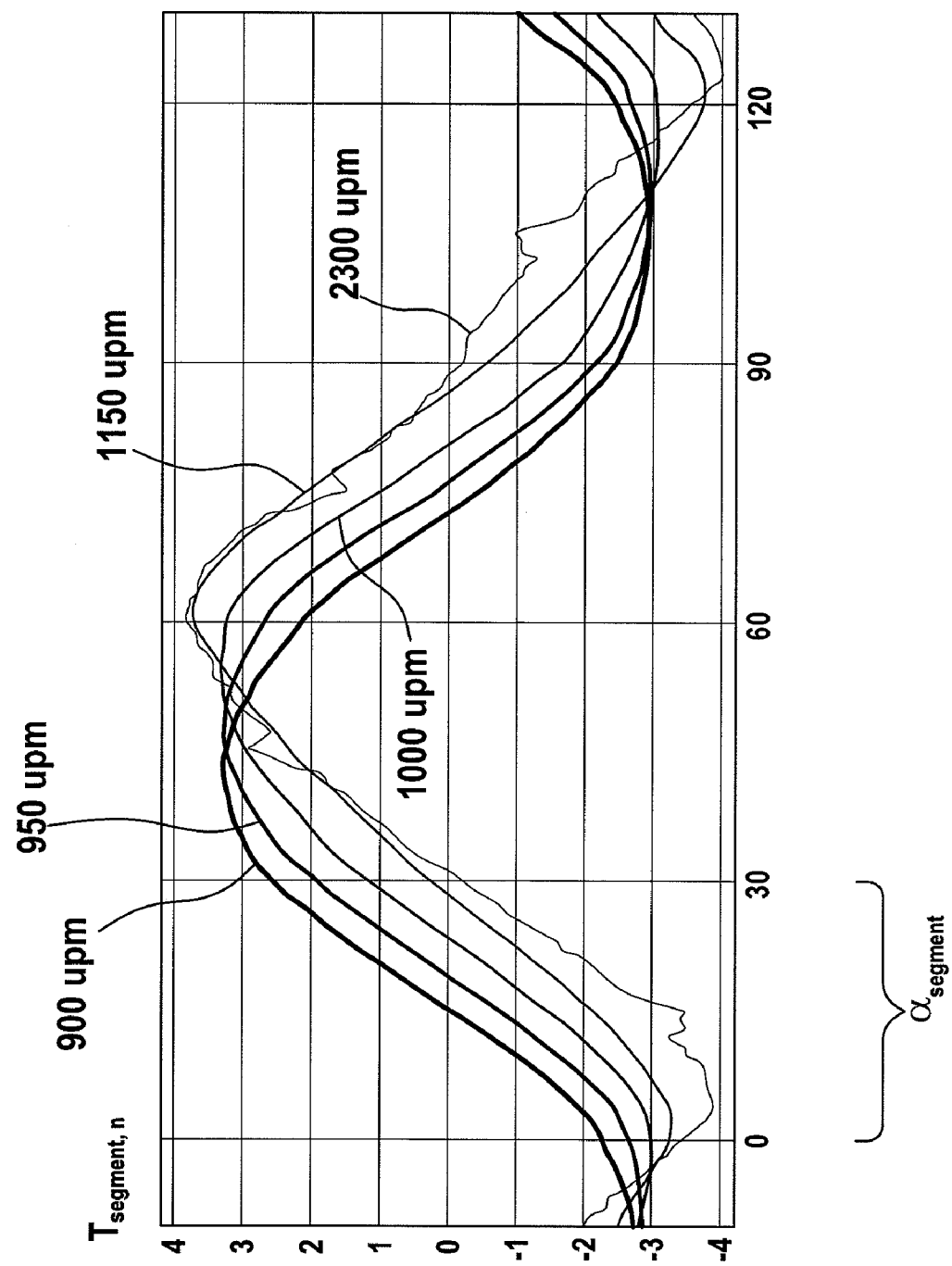
FIG. 8 standard angled segments put on above the work cycle of a combustion engine for different engine speeds of the combustion engine and FIG. 9 standard uneven running values at different engine speeds above the firing order of the cylinders.

In the diagram that is illustrated in FIG. 8 the tooth numbers that correspond with the angle segments of the cylinders 1 to 4 are shown on the abscissa. These teeth are spread on the circumferential side of the first mass 28 or on a separate trigger wheel. There are for example 60 teeth spread on 360°, so that the teeth 0 to 30 are assigned to cylinder 1 and the teeth 30 to 60 to cylinder 2. The teeth 60 to 90 are physically the same teeth as 0 to 30, but they are counted as teeth 60 to 90 depending on the phase position of the camshaft and they are assigned to cylinder 3. In a corresponding way the teeth 90 to 120 correspond with cylinder 4.

Standard segment times for different engine speeds of the combustion engine 12 are put on the ordinate of the diagram shown in FIG. 8. It implies for example for an engine speed of 2.300 Upm that the segment times during the first two angle segments (corresponding with teeth 0 to 60) increase. That is because the cylinder 1 and 2 are misfiring cylinders. The tooth numbers 60 to 120 are assigned to the standard segment times, because cylinders 3 and 4 are firing. When transferring to lower engine speeds, up to for example 900 Upm, this implies a phase shifting up to lower tooth numbers, which depends on the excitation of the crankshaft 14 by the second mass 30.

Figure 9:
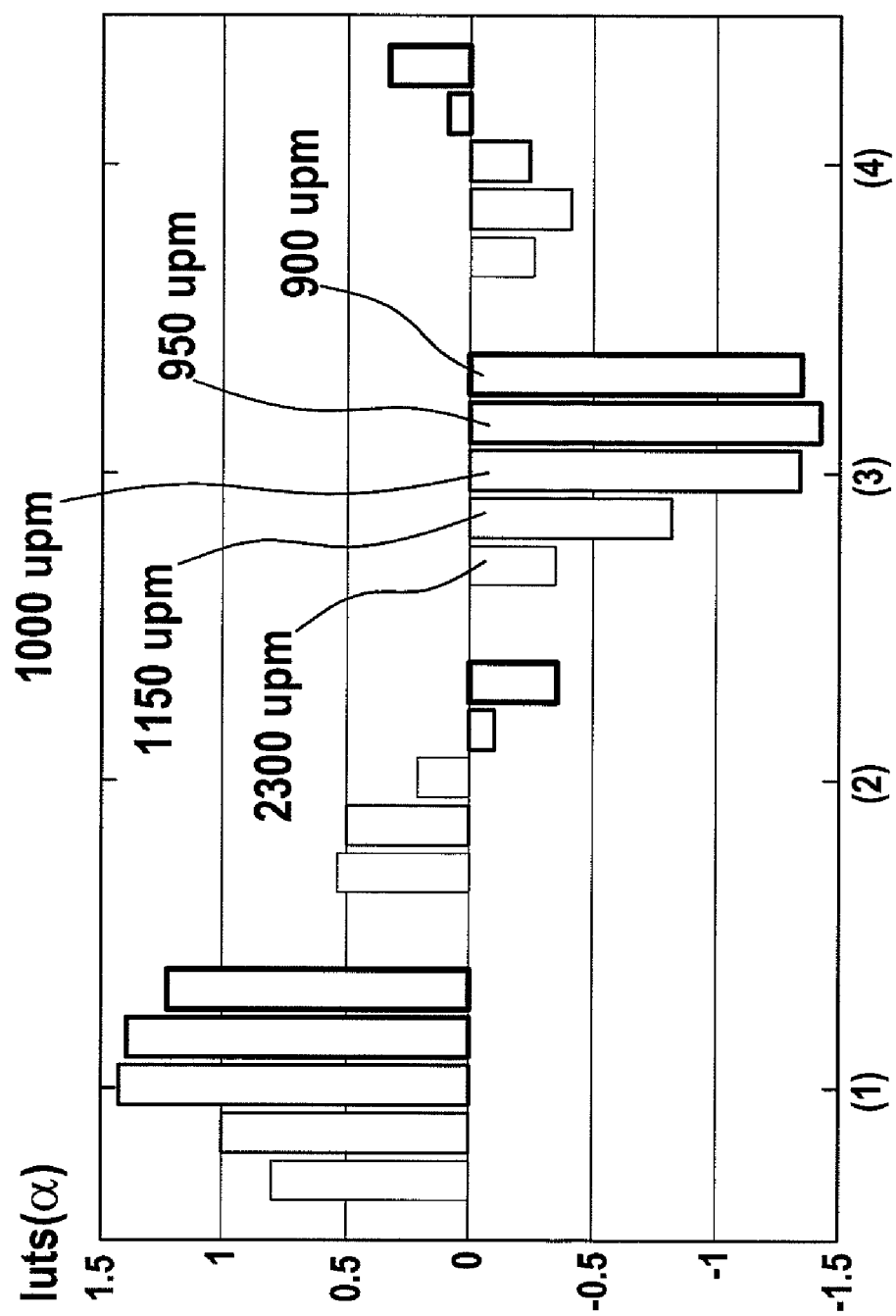

Transferred on the uneven running values illustrated in FIG. 9, which are assigned to the cylinders 1 to 4, it is implied for higher engine speeds, for example 2.300 Upm and for 1.150 Upm, that the algebraic sign of the uneven running values that is put on the abscissa for each cylinder corresponds with whether this cylinder is a misfiring or firing cylinder. Thus for the example of 2.300 Upm positive uneven running values (see left beam of the group of five to cylinders 1 and 2) are assigned to cylinders 1 and 2 and cylinders 3 and 4 to negative uneven running values (see left beam of the group of five to the cylinders 3 and 4). At low rotations, for example at 900 Upm, the first cylinder is assigned to low uneven running values (right beam of the group of five to cylinder 1), but the algebraic sign of the uneven running value that is assigned to cylinder 2 is negative in that case. In a corresponding way also the algebraic sign of the uneven running value that is assigned to cylinder 4 changes, which is shifted at lower engine speeds from a negative to a positive uneven running value.

For each case, which is illustrated in FIG. 9 and which apply to different engine speeds of the combustion engine 12, it can be unequivocally determined with the aid of the previously described condition 1 and 2, which of the cylinders are misfiring. Therefore the cylinder with the highest uneven running is determined (cylinder 1) and the following cylinder, thus cylinder 2, is detected as misfiring in case the second condition is fulfilled. The cylinder 2 is detected as misfiring in that case even though it is assigned to a negative uneven running value at low engine speeds (compare right beam of the group of five that is assigned to cylinder 2).

The invention claimed is:

1. Procedure for determining at least one misfiring cylinder of a combustion engine with an even number n of at least four cylinders,
    wherein each cylinder is assigned to its own angle segment of a work cycle of the combustion engine and
    wherein uneven running values (luts) are determined for each cylinder,
        wherein the uneven running values (luts) are evaluated with regard to the fulfillment of a condition, which is set depending on the length of the angle segment or a part or a multiple of the length of the angle segment and which corresponds with a default misfiring pattern of the combustion engine; and
        wherein the uneven running values (luts) are evaluated with regard to at least one of the following conditions:
            i. after the cycle of one angle segment the amount of uneven running values (luts) repeat, whereby the algebraic sign of those uneven running values (luts) is reversed,
            ii. after the cycle of n/2 consecutive angle segments the amounts of uneven running values (luts) repeat, whereby the algebraic sign of those uneven running values (luts) is reversed.

2. Procedure according to claim 1, wherein in case the first condition is fulfilled or at least approximately fulfilled, a misfiring is detected of:
- a first cylinder with a maximum uneven running value (luts), and
- at least a further cylinder, which is/are shifted by an integral, positive multiple of the number 2 in firing order of the combustion engine relative to the first cylinder.

3. Procedure according to claim 1, wherein in case the number n of cylinders equals 4 and in case the first condition is fulfilled or at least approximately fulfilled, a misfiring is detected of
- a first cylinder with a maximum uneven running value (luts), and
- a further cylinder, which is shifted by the number 2 in the firing order of the combustion engine relative to the first cylinder.

4. Procedure according to claim 1, wherein in case the second condition is fulfilled or at least approximately fulfilled, a misfiring is detected of:
- a first cylinder with a maximum uneven running value (luts), and
- at least a further cylinder of the following cylinders that follows the first cylinder in firing order of the combustion engine, wherein the number of the further cylinders amounts to n/2−1.

5. Procedure according to claim 1, wherein in case the second condition is fulfilled or at least approximately fulfilled, a misfiring is detected of:
- a first cylinder with a maximum uneven running value (luts), and
- a further cylinder, which directly follows the first cylinder in firing order of the combustion engine.

6. Procedure according to claim 1, wherein the uneven running values (luts) are evaluated at least with regard to the first condition and the second condition.

7. Control unit configured to implement a procedure according to claim 1.

8. Motor vehicle drive train with a combustion engine with an even number n of at least four cylinders, with a crankshaft, which is connected in a torque-proof way to a first mass of a multi-mass flywheel, whereby a second mass is able to vibrate relative to the first mass in rotational direction of the crankshaft and reversed to it, whereby the second mass is connected in a torque-proof way with a transmission, wherein the combustion engine further comprises a control unit, which is configured to implement a procedure according to claim 1.

9. Procedure according to claim 1, wherein the uneven running values (luts) of at least one work cycle are evaluated with regard to at least one further condition, which refers at least approximately to a repetition of absolute uneven running values (luts) or the amounts of the absolute uneven running values (luts) with a default repetition frequency.

10. Procedure according to claim 9, wherein the repetition frequency of the at least one further condition equals the angle segment multiplied with a positive, integral value bigger or equal 2.

11. Procedure for determining at least one misfiring cylinder of a combustion engine with an even number n of at least four cylinders,
- wherein each cylinder is assigned to its own angle segment of a work cycle of the combustion engine and
- wherein uneven running values (luts) are determined for each cylinder,
  - wherein the uneven running values (luts) are evaluated with regard to the fulfillment of a condition, which is set depending on the length of the angle segment or a part or a multiple of the length of the angle segment and which corresponds with a default misfiring pattern of the combustion engine; and
- wherein in case no condition is fulfilled, only one cylinder is detected as misfiring, which is assigned to a maximum uneven running value (luts).

* * * * *